United States Patent
Ting et al.

(10) Patent No.: US 8,233,531 B2
(45) Date of Patent: Jul. 31, 2012

(54) PROCESSING APPARATUS AND PROCESSING METHOD FOR A DIGITAL TELEVISION

(75) Inventors: Hung-Kai Ting, Chungli (TW); Chih-Ta Chen, Taipei (TW); Weichun Tung, Hsinchu County (TW); Chih-Min Wang, Hsinchu (TW)

(73) Assignee: Mstar Semiconductor, Inc., Chu Pei, Hsinchu Hsien (TW)

( * ) Notice: Subject to any disclaimer, the term of this patent is extended or adjusted under 35 U.S.C. 154(b) by 945 days.

(21) Appl. No.: 12/260,594

(22) Filed: Oct. 29, 2008

(65) Prior Publication Data

US 2009/0110057 A1 Apr. 30, 2009

(30) Foreign Application Priority Data

Oct. 29, 2007 (TW) .............................. 96140564 A

(51) Int. Cl.
*H04N 7/12* (2006.01)

(52) U.S. Cl. .................................. 375/240.01; 348/720

(58) Field of Classification Search ................... 348/720, 348/639, 646, 651, 660
See application file for complete search history.

(56) References Cited

U.S. PATENT DOCUMENTS

| 6,212,680 | B1 * | 4/2001 | Tsinberg et al. | 725/39 |
| 6,317,162 | B1 * | 11/2001 | Matsumoto | 348/553 |
| 7,565,653 | B2 | 7/2009 | Inoue et al. | |
| 2003/0206553 | A1 * | 11/2003 | Surcouf et al. | 370/419 |
| 2004/0239809 | A1 * | 12/2004 | Kim et al. | 348/563 |
| 2007/0160205 | A1 * | 7/2007 | Choe | 380/200 |

FOREIGN PATENT DOCUMENTS

| TW | 264969 | 12/1995 |
| TW | 200540705 A | 12/2005 |

OTHER PUBLICATIONS

First Office Action, mailed Apr. 28, 2011, received in counterpart Taiwan Patent Application No. TW 096140564, 8 pgs.; (with partial English translation, 4 pgs.).
Partial English translation of First Office Action, mailed Apr. 28, 2011, received in counterpart Taiwan Patent Application No. TW 096140564, 4 pgs.
English translation of abstract of TW 264969, 1 pg.
English translation of abstract of TW 200540705, 1 pg.

\* cited by examiner

*Primary Examiner* — Matthew Smithers
(74) *Attorney, Agent, or Firm* — Holland & Knight, LLP; Brian J. Colandreo, Esq.; Mark H. Whittenberger, Esq.

(57) ABSTRACT

A processing method and a processing apparatus for a digital television are provided. A processing apparatus for a digital television (DTV) to process a DTV stream, comprising: a demultiplexing unit for retrieving a service information from the DTV stream; a memory coupled to the demultiplexing unit for storing the service information; a first processor coupled to the memory for assigning a task by sending a command according to the service information; a second processor coupled to the memory for processing the task according the command; a communication unit coupled to the first processor and the second processor, for receiving the command from the first processor and sending the command to the second processor; and at least one function module coupled to the first processor and the second processor, respectively, controlled by the first processor or the second processor, to process the service information.

11 Claims, 5 Drawing Sheets

| Byte 0 | Byte 1 | Byte 2 | Byte 3 | Byte 4 | Byte 5 | Byte 6 | Byte 7 |
|---|---|---|---|---|---|---|---|
| Control byte | Command type | Command code | No. of parameters | Parameter 0 | Parameter 1 | Parameter 2 | Parameter 3 |
| Byte 8 | Byte 9 | Byte 10 | Byte 11 | Byte 12 | Byte 13 | Byte 14 | Byte 15 |
| Parameter 4 | Parameter 5 | Parameter 6 | Parameter 7 | Parameter 8 | Parameter 9 | Status byte | |

FIG. 2

PROCESSING APPARATUS AND PROCESSING METHOD FOR A DIGITAL TELEVISION

CROSS-REFERENCE TO RELATED APPLICATION

This application claims priority to Taiwan Patent Application No. 096140564 filed on 29 Oct. 2007, the contents of which are incorporated herein by reference in its entirety.

BACKGROUND OF THE INVENTION

1. Field of the Invention

The present invention relates to a dual-processor apparatus and a processing method for a digital television (DTV).

2. Descriptions of the Related Art

Digital televisions (DTVs) are expected to become the focus in the development of the next generation of household information appliances and also an important gateway for accessing the Internet from home.

DTVs, which are apparatuses that receive DTV signals, are configured to receive audio/video data transmitted by a TV station. The audio/video data is processed (e.g., encoded, compressed and etc.) digitally in the television station at the central office and then broadcasted, multicasted or unicasted to a DTV terminal. When the digital signals are received, the DTV terminal decompresses and decodes, and then display on a TV screen. Here, "digital" indicates that the TV signals are encoded in a digital manner. Because this can improve the immunity against the interference and bandwidth can be exerted effectively. Industry standards for this kind of digital encoding and decoding for DTV are mainly published by ITU-T and ISO/IEC standard organization. For example, H.261, H.262 and H.263 standards are published by the ITU-T. The compression standards published by the ISO/SEC are categorized as: JPEG, JPIG and JPEG2000 for still picture compression; MPEG-1 (Moving Picture Experts Group) and MPEG-2 for moving picture compression and encoding; MPEG-4 for multimedia encoding/decoding and compression based on audio/video media objects, MPEG-7 ("multimedia content description interface") and MPEG-21 ("Multimedia Framework"). Furthermore, relevant standards also include the H.264 standards proposed by the JVT Organization. Among these standards, the MPEG series has become the most popular international standards for multimedia technologies, and has exerted a great and far-reaching influence on the development of DTVs, audio/video consumer electronics and multimedia communication industries. With the above digital signal compression technologies, it is possible for DTVs to transmit High-Definition TV (HDTV) signals with a much higher definition and audio quality than traditional analog TVs. It is also possible to transmit Enhanced Definition TV (EDTV) and Standard Definition TV (SDTV) programs simultaneously in a channel. The DTV service providers may transmit a large amount of information related to TV programs or other services via data bitstreams while broadcasting TV programs. Therefore, a DTV system is much better than a traditional analog TV system in terms of audio/video performance and compatibility with computer information products.

A typical DTV uses a single Complex Instruction Set Computer (CISC) processor (e.g., a 32-bit MIPS/ARM processor) with a high computing capacity to process video and audio streams related to DTV signals, and also to undertake a large amount of calculations with respect to particular information. Accordingly, a complex management and processing mechanism or operating system is needed in a DTV of this structure to assign and manage the software and hardware resources of the DTV, as well as to schedule and manage various operations. However, the use of a complex management and processing mechanism or operating system will not only increase the need for a stronger DTV hardware and added software and hardware costs, but also decrease the processing efficiency and timeliness.

Accordingly, a new DTV structure is proposed in this invention to solve these problems.

SUMMARY OF THE INVENTION

One objective of this invention is to provide a processing apparatus for a digital television (DTV). A processing apparatus for a digital television (DTV) to process a DTV stream, comprising: a demultiplexing unit for retrieving a service information from the DTV stream; a memory coupled to the demultiplexing unit for storing the service information; a first processor coupled to the memory for assigning a task by sending a command according to the service information; a second processor coupled to the memory for processing the task according the command; a communication unit coupled to the first processor and the second processor, for receiving the command from the first processor and sending the command to the second processor; and at least one function module coupled to the first processor and the second processor, respectively, controlled by the first processor or the second processor, to process the service information.

Another objective of this invention is to provide a processing method for a DTV. A processing method for a DTV having a first processor, a second processor and a communication unit to process a DTV stream, the method comprising the following steps of; retrieving and storing a service information from the DTV stream; assigning a task according to the service information and sending a command to the communication by the first processor; receiving the command and sending it to the second processor by the communication unit; and processing the task by the second processor.

A further objective of this invention is to provide a processing method for a DTV. A processing method for a DTV having a first processor, a second processor and a communication unit to decompress vector font data, the method comprising the following steps of: receiving a service information for decompressing the vector font data; loading vector font data and sending a command to the communication unit by the first processor; receiving the command and sending it to the second processor by the communication unit; and accessing the vector font data and decompressing the vector font data by the second processor.

By accomplishing the above objectives, this invention is capable of using at least two processors for processing or decoding a DTV, rather than using only one CISC processor for processing like those in conventional DTVs. Therefore, DTV processing can be accomplished by using different processors in combination, for example, an 8-bit 8051 microprocessor in combination with a 32-bit MIPS/ARM processor.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 2 is the data format in a message register of this invention;

DESCRIPTION OF THE PREFERRED EMBODIMENT

Figure 1:
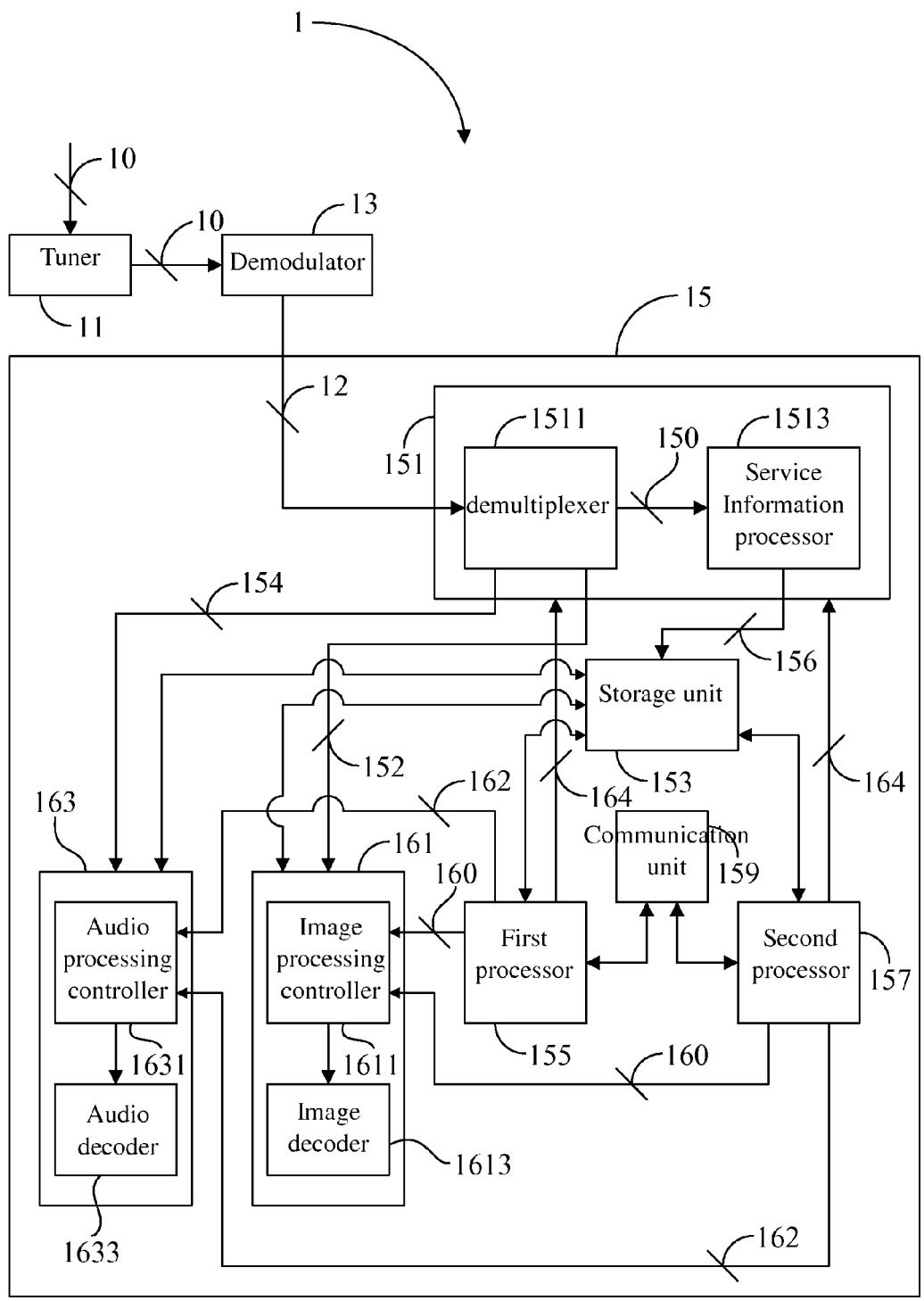
FIG. 1 illustrates the system structure of this invention.

The system structure of a digital television (DTV) processing apparatus 1 according to this invention is depicted in FIG. 1. The DTV processing apparatus 1 comprises a tuner 11, a demodulator 13 and a processing apparatus 15 for processing the DTV data stream. The processing apparatus 1 receives DTV broadcasting signals 10. The DTV broadcasting signals 10 may comply with the Digital Video Broadcasting-Terrestrial (DVB-T) standard, the Digital Video Broadcasting-Satellite (DVB-S) standard, or the Digital Video Broadcasting-Cable (DVB-C) standard established by the Digital Video Broadcasting (DVB) Organization; the Digital Television Standard established by the Advanced Television System Committee (ATSC); or relevant DTV standards established by other standardization organizations. When processed by the demodulator 13, the DTV broadcasting signals 10 are be transferred to a DTV data stream 12, which is then received and processed by the processing apparatus 15.

The processing apparatus 15 comprises a demultiplexing unit 151, a memory 153, a first processor 155, a second processor 157, a communication unit 159, and a plurality of function modules such as an image processing module 161 and an audio processing module 163. The demultiplexing unit 151 further comprises a demultiplexer 1511 and a service information processor 1513. The demultiplexer 1511 is configured to receive the DTV data stream 12 and process it into a video stream 152, an audio stream 154 and at least one data stream 150. After receiving the data stream 150, the service information processor 1513 retrieves from the data stream 150 at least one piece of DTV service information 156, for example, information related to DTV services such as an electronic program guide (EPG), subtitles, and MHEG-5 information. The DTV service information 156 is then stored into the memory 153.

The first processor 155 and the second processor 157 exchange information via the memory 153 and the communication unit 159, and both are able to control a plurality of function modules such as the image processing module 161 and the audio processing module 163. In the preferred embodiment, the first processor 155 may be a processor with a low processing capacity, for example (but not limited to) a 8-bit processor, which is primarily intended to process the information related to on-screen display (OSD), manage system resources and task assignment, and retrieve DTV service information. Moreover, the first processor 155 can receive a user control command 164 to control the demultiplexing unit 151 to receive DTV data streams 12 and retrieve the service information 156. On the other hand, the second processor 157 may be a processor with a high processing capacity, for example (but not limited to) a 32-bit processor, which is primarily intended to process the information in the DTV data stream 12 that necessitates complex computations, for example, MEHG-5 and JAVA multimedia information. When receiving a message to process such information involving complex computations, the first processor 155 calls the second processor 157 via the communication unit 159 to access the information from the memory 153 and process it. The second processor 157 may also be provided with an ability to control the demultiplexing unit 151. On the other hand, if the information processed by the second processor 157 needs to be responded to the first processor 155 or processed furthermore by the first processor 155, the second processor 157 calls the first processor 155 via the communication unit 159. And the second processor 157 stores the processed information into the memory 153. The communication unit 159, which is an interrupting processing unit, an information register or a combination thereof, is configured to transmit commands between the first processor 155 and the second processor 157. In the preferred embodiment, an interrupting processing unit of the communication unit 159 may provide bi-directional interrupting commands. The message register comprises two groups of 16-byte registers: one is used by the first processor to call the second processor, while the other is used by the second processor to call the first processor. A data format of the register is shown in FIG. 2. Byte 0 to Byte 2 are used to label different kinds of calling messages such as the processing of the vector font and also processing the MHEG-5 information or the like. Byte 3 is used to indicate the content length of the calling message, Byte 4 to Byte 13 are used for the content of the calling information, while the Byte 14 to Byte 15 are used as status bytes to record the current processing status. When the first processor 155 needs to send a calling message or a command to the second processor 157, the content of the calling message is filled into the register and sends an interrupting command via the interrupting unit to call the second processor 157. When the interrupting command is received, the second processor 157 reads the register and operates according to the content stored therein.

The operation of a DTV, as well as the communications and division of work between the first processor 155 and the second processor 157 will now be further described with reference to two methods for processing particular DTV information. When information to be processed is vector font information, the first processor 155 calls the second processor 157 via the communication unit 159 to access the vector font information stored in the memory 153. Subsequently, the second processor 157 decompresses the vector font information into bitmap information, and then calls the first processor 155 via the communication unit 159 to inform the processing result of the vector font information.

Alternatively, when the processed information is an MHEG-5 (Multimedia and Hypermedia Experts Group-5) message, the first processor 155 calls the second processor 157 via the communication unit 159 to process this MHEG-5 message. Then the second processor gains control of the demultiplexing unit 151, analyzes the MHEG-5 message, and retrieves the IFrame data therefrom to be stored into the memory 153. Subsequently, the second processor 157 calls the first processor 155 directly or via the communication unit 159 to control the image processing module 161 to access the IFrame data from the memory 153 and decompress the IFrame data into the picture data.

Furthermore, the first processor 155 and the second processor 157 can further control the function modules (e.g., the image processing module 161 and the audio processing module 163) to process particular information, such as the video stream 152 and the audio stream 154 described above. The function modules 161, 163 of the processing apparatus usually have a programmable control unit (i.e., an image processing controller 1611 and an audio processing controller 1631) and a particular function processing unit (i.e., an image decoder 1613 and an audio decoder 1633). The programmable control unit has a control program (not shown) stored therein, which can be reprogrammed according to the DTV standards of different countries to enhance its expandability and fault tolerance. More specifically, by using the programmable control unit and the particular function processing unit in combination, the processing apparatus 15 can process the various particular information of the DTV data stream 12 more promptly.

In particular, according to the video control command 160 transmitted by the first processor 155 or the second processor 157 and a control program stored in the image processing controller 1611, the image processing controller 1611 can control the image decoder 1613 to decode the video stream 152 or other image information, for example, an MEHG-5 IFrame.

Likewise, according to the audio control command 162 transmitted by the first processor 155 or the second processor 157 and a control program stored in the audio processing controller 1631, the audio processing controller 1631 can control the audio decoder 1633 to decode the audio stream 154 or other audio information.

This invention further provides a processing method for a DTV, which is applicable to the processing apparatus 15 described above.

Figure 3:
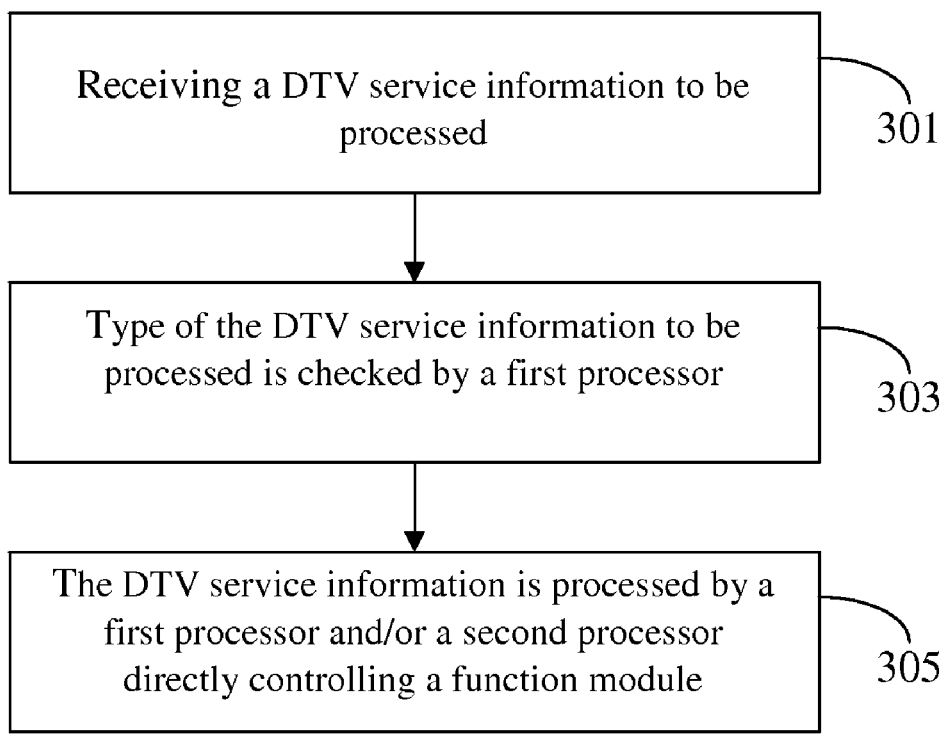
FIG. 3 is a flow diagram illustrating a method for processing the DTV information of this invention.

In more detail, the processing method for a DTV is implemented by an application controlling the various modules of the processing apparatus 15, and a corresponding flow diagram thereof is depicted in FIG. 3.

Initially in step 301, the DTV service information is received. Then in step 303, the type of DTV service information is checked by a first processor 155. Finally in step 505, the DTV service information is processed by a first processor 155 and/or a second processor 157 directly controlling the function module.

Figure 4:
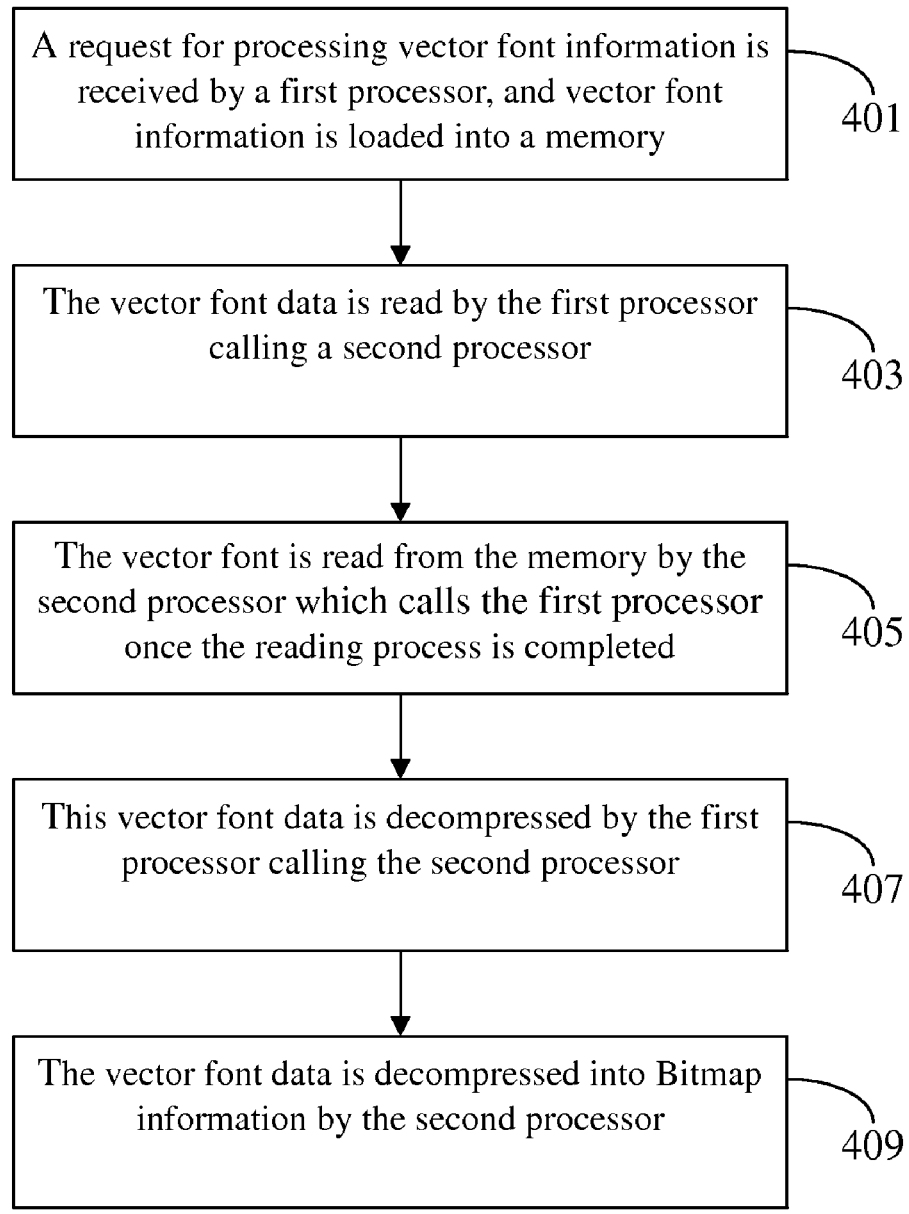
FIG. 4 is a flow diagram illustrating a method for processing the DTV vector font of this invention.

To illustrate this invention more clearly, a further description will now be made with reference to the two kinds of exemplary particular DTV information. This invention provides a processing method for a DTV vector font, which is applicable to the processing apparatus 15 described above. A corresponding flow diagram of this processing method is depicted in FIG. 4.

Initially in step 401, service information for processing the vector font information is received by the first processor 155, while vector font information is loaded into a memory 153. Then in step 403, the vector font data is read by the first processor 155 that calls the second processor 157 through the communication unit 159. Next in step 405, the vector font is read from the memory 153 by the second processor 157 which calls the first processor 155 once the reading process is completed. Subsequently in step 407, the first processor 155 calls the second processor 157 to decompressed the vector font data through the communication unit 159. Finally in step 409, the vector font data is decompressed into Bitmap information by the second processor 157.

Figure 5:
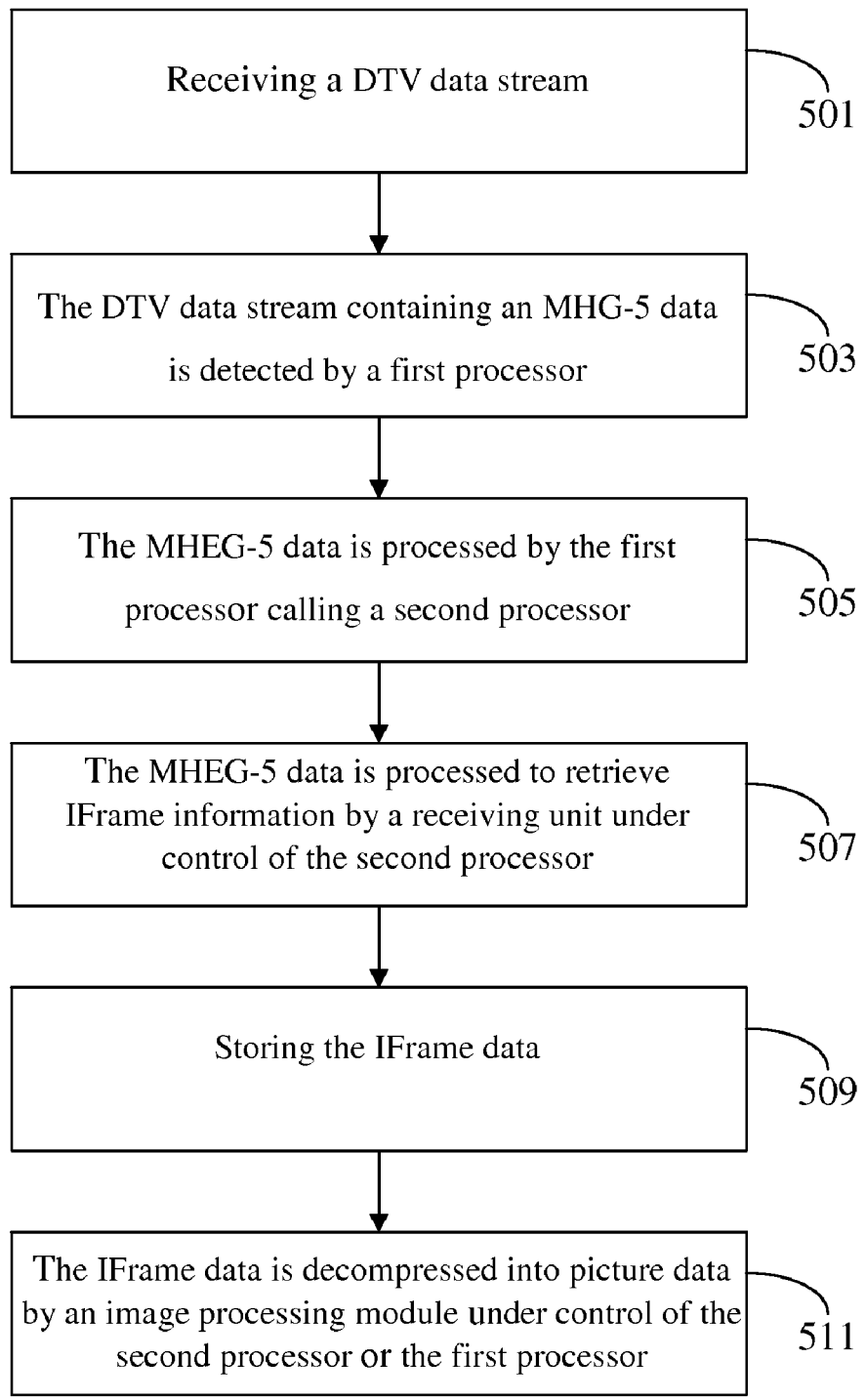
FIG. 5 is a flow diagram illustrating another method for processing the DTV information of this invention.

This invention further provides another processing method for a DTV, which is applicable to the processing apparatus 15 described above. A corresponding flow diagram of this processing method is depicted in FIG. 5.

Initially in step 501, a DTV data stream is received. Then in step 503, the DTV data stream is detected by a first processor 155 to determine if an MHEG-5 message is incoming. Subsequently, the MHEG-5 message is processed by the first processor 155 calling a second processor 157 in step 505. Next in step 507, the MHEG-5 message is processed to retrieve IFrame data by the second processor 157. Then in step 509, the IFrame data is stored in the memory 153. Finally in step 511, the IFrame data is decompressed into picture data by an image processing module 161 under control of the second processor 157 or the first processor 155.

It follows from the above description that this invention uses at least two processors to process or decode DTV data streams. That is, the DTV data streams are processed by a combination of different processors, for example, an 8-bit 8051 microprocessor in combination with a 32-bit processor. In a structure where a plurality of processors cooperates to process the information can decrease the complexity in software and hardware of a DTV, thus increasing the processing efficiency and timeliness thereof. Furthermore, this may also prevent additional costs and time required to develop a CISC processor applicable to a DTV.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A processing apparatus for a digital television (DTV) to process a DTV stream, comprising:
   a demultiplexing unit for retrieving a service information from the DTV stream;
   a memory coupled to the demultiplexing unit for storing the service information;
   a first processor coupled to the memory for assigning a task by sending a command according to the service information;
   a second processor coupled to the memory for handling the task according the command;
   a communication unit coupled to the first processor and the second processor, for receiving the command from the first processor and sending the command to the second processor; and
   at least one function module controlled by the second processor, to process the task.

2. The processing apparatus as claimed in claim 1, wherein one of the at least one function module is a image module, the image module comprises:
   an image decoder; and
   a programmable control unit, storing a control program, for receiving a video stream of the DTV, and to control the image decoder to decode the video stream according to a control command and the control program;
   wherein the control command is sent by one of the first processor and the second processor.

3. The processing apparatus as claimed in claim 1, wherein the demultiplexing unit comprises:
   a demultiplexer for receiving a DTV stream to separate a data stream from the DTV stream; and
   a service information processor coupled to the demultiplexer and the memory for retrieving the service information from the data stream.

4. The processing apparatus as claimed in claim 1, wherein the memory is further used for storing information processed by the second processor and accessed by the first processor, and wherein the communication unit is further used for receiving a command from the second processor and sending the command to the first processor.

5. The processing apparatus as claimed in claim 1, wherein the first processor is a 8-bit processor, and the second processor is a 32-bit processor.

6. The processing apparatus as claimed in claim 1, wherein the demultiplexing unit retrieves a Multimedia and Hypermedia Experts Group-5 (MHEG-5) signal, the first processor retrieves IFrame data from the MHEG-5 signal and stores the IFrame data in the memory, and the second processor calls the first processor via the communication unit to access the IFrame data from the memory, and the first processor decompresses the IFrame data into picture data.

7. A processing method for a DTV having a first processor, a second processor and a communication unit to process a DTV stream, the method comprising the following steps of:

retrieving and storing a service information from the DTV stream;

assigning a task according to the service information and sending a command to the communication by the first processor;

receiving the command and sending it to the second processor by the communication unit; and processing the task by the second processor.

8. The processing method as claimed in claim 7, further comprising the following step of:

processing the service information by a function module controlled by the second processor.

9. The processing method as claimed in claim 7, further comprising the following steps of:

storing a response information and sending another command to the communication unit by the second processor;

receiving the another command and sending it to the first processor by the communication unit; and processing according to the response information by the first processor.

10. The processing method as claimed in claim 7, wherein the retrieving step further comprises the following steps of:

processing a DTV stream to generate a data stream; and retrieving a service information from the data stream.

11. A processing method for a DTV having a first processor, a second processor and a communication unit to decompress vector font data, the method comprising the following steps of:

receiving a service information for decompressing the vector font data;

loading vector font data and sending a command to the communication unit by the first processor;

receiving the command and sending it to the second processor by the communication unit; and accessing the vector font data and decompressing the vector font data by the second processor.

* * * * *